(12) United States Patent
Kim et al.

(10) Patent No.: US 12,103,725 B2
(45) Date of Patent: Oct. 1, 2024

(54) SYSTEM FOR REMOVING PACKAGING FILM FROM ARTICLE

(71) Applicant: CJ CHEILJEDANG CORPORATION, Seoul (KR)

(72) Inventors: Myung Ho Kim, Jincheon-eup (KR); Sung Woo Park, Jincheon-eup (KR); Bong Yong Sung, Gimhae-si (KR); Hee Dong Son, Changwon-si (KR); Dae Hwa Kim, Osan-si (KR); Sun Kyu Kim, Hwaseong-si (KR); Soo Hyun Kim, Gimpo-si (KR); Hak Dong Kim, Suwon-si (KR); In Soo Jung, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 113 days.

(21) Appl. No.: 17/801,223

(22) PCT Filed: Feb. 19, 2021

(86) PCT No.: PCT/KR2021/002134
§ 371 (c)(1),
(2) Date: Aug. 19, 2022

(87) PCT Pub. No.: WO2021/167405
PCT Pub. Date: Aug. 26, 2021

(65) Prior Publication Data
US 2022/0411121 A1 Dec. 29, 2022

(30) Foreign Application Priority Data
Feb. 19, 2020 (KR) .................. 10-2020-0020683

(51) Int. Cl.
*B65B 69/00* (2006.01)
*B65G 47/91* (2006.01)

(52) U.S. Cl.
CPC ............ *B65B 69/00* (2013.01); *B65G 47/918* (2013.01)

(58) Field of Classification Search
None
See application file for complete search history.

(56) References Cited

U.S. PATENT DOCUMENTS 5,371,938 A * 12/1994 Martin ............... B65B 69/0033
414/412
5,375,961 A    12/1994 Mojden et al.
(Continued)

FOREIGN PATENT DOCUMENTS

CN    103482155 A    1/2014
CN    110328685 A    10/2019
(Continued)

OTHER PUBLICATIONS

International Search Report from WIPO in Application No. PCT/KR2021/002134 dated May 7, 2021, 7 pages.
Extended European Search Report issued in European Patent Application No. 21756565.4, mailed Aug. 16, 2023.

*Primary Examiner* — Kavel Singh
(74) *Attorney, Agent, or Firm* — DILWORTH IP, LLC (57) ABSTRACT

A system for removing a product-packing film from a product having an axis in a longitudinal direction. The packing film surrounds lateral portions of the product. A first end of the packing film surrounding a first longitudinal end of the product is open. A second end of the packing film surrounding a second end of the product opposite the first end of the product is closed. In the system, a conveyor carries a plurality of products each packed with a packing film in a direction perpendicular to the axes of the products while supporting the products such that the axes of the products are parallel to each other. A suction unit draws the first end of the packing film in an axial direction of each of (Continued)

the products. A clamping unit clamps the first end of the packing film drawn by the suction unit.

8 Claims, 5 Drawing Sheets

(56) References Cited

U.S. PATENT DOCUMENTS

| | | | |
|---|---|---|---|
| 7,963,086 B2* | 6/2011 | Porter | B65B 69/0025 |
| | | | 53/381.1 |
| 8,997,443 B2* | 4/2015 | Corradi | B65B 69/0066 |
| | | | 53/381.1 |
| 9,067,699 B2* | 6/2015 | Anatrini | B65B 69/0008 |
| 9,272,804 B2* | 3/2016 | Pippin | B65B 69/0033 |
| 10,696,506 B2* | 6/2020 | Hannen | B65H 18/026 |
| 2007/0169438 A1* | 7/2007 | Brown | B65B 69/0033 |
| | | | 53/381.2 |
| 2007/0169604 A1* | 7/2007 | Brown | B26D 1/165 |
| | | | 83/651 |

FOREIGN PATENT DOCUMENTS

| | | |
|---|---|---|
| JP | 07010140 A | 1/1995 |
| JP | 10167237 A | 6/1998 |
| JP | H10167237 A | 6/1998 |
| JP | 2001-146219 A | 5/2001 |
| KR | 20100108163 A | 10/2010 |
| KR | 10-2008201 B | 8/2019 |
| KR | 10-2119679 B1 | 6/2020 |
| WO | 9729956 A1 | 8/1997 |

* cited by examiner

SYSTEM FOR REMOVING PACKAGING FILM FROM ARTICLE

FIELD OF THE INVENTION

The present disclosure relates to a system for removing a packing film from a product, and more particularly, to a system for automatically removing a packing film from a product, wherein the packing film packages a product in a sealing manner in order to prevent the product from being contaminated or damaged during transportation or storage.

BACKGROUND OF THE INVENTION

Products moved from one area to another area are generally contained in a box or the like that is sealed to prevent the products from being contaminated or damaged and for ease of transportation and storage. In particular, products, such as hygiene products or foods, are packaged with films to be prevented from being contaminated by impurities or the like, which would otherwise be attached thereto, before being contained in boxes for transportation or storage.

Figure 1:
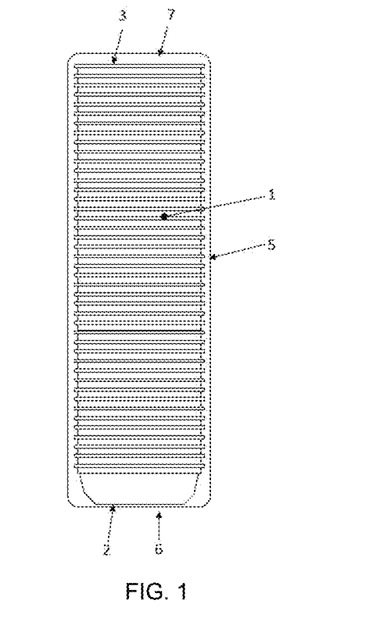
FIG. 1 is a view illustrating a state in which a product supposed to be handled by a system for removing a packing film according to an embodiment of the present disclosure are packed with a packing film, which is illustrated as being transparent.

An example product packaged with such a packing film is illustrated in FIG. 1.

A product 1 illustrated in FIG. 1 is comprised of synthetic resin vessels each having the shape of a bowl for containing food, in which the vessels are stacked on each other in the top-bottom direction and packaged with a packing film 5. The product 1 is contained in the packing film 5 so that the plurality of vessels may be handled as a single article and protected from external contamination. The product 1 is contained in the packing film 5 and received in a box or the like so as to be transported and stored.

In order to use such a product 1, it is necessary to open the box, withdraw the product from the box, and remove the packing film 5 before using the product.

For example, in homes, industry, or the like, where a small number of products are intermittently handled, an operation of removing packing boxes or packing films from products does not significantly impede the progress of work. However, the product 1 illustrated in FIG. 1 may be subjected to a process of inputting the product to a food production process, inserting food into the vessels, and shipping the vessels, into which the food has been inserted, as a commercial product.

Thus, the food production process is an operation in which a large number of vessels are input. In addition, work of withdrawing the product 1 from the packing box and removing the packing film 5 from the product 1 is significantly simple but time-consuming work.

Korean Patent No. 10-1554009 (Document 1) and Korean Patent No. 10-1527654 (Document 2) respectively disclose a configuration enabling a product to be easily withdrawn from a packing box. However, a configuration for easily removing a film when the withdrawn product is packed with the film has not been considered.

In other conventional approaches, only packing-facilitating methods or packing methods have been considered. However, it may be difficult to find consideration or study of a method or apparatus for facilitating or automating a film removal operation that may require a significant amount of labor in a mass production process or the like.

SUMMARY OF THE INVENTION

Technical Problem

The present disclosure is intended to provide a system for removing a film from a product, wherein the film is used to pack a product in a sealing manner in order to prevent the product from being contaminated or damaged during transportation or storage of the product.

Specifically, the present disclosure is intended to provide a system for removing a product-packing film from a product, wherein the film is configured to close lateral portions and one end of an elongated product while not closing the other end of the product.

In addition, the present disclosure is intended to provide a removal system able to automate an operation of removing a packing film from a product without the intervention of a worker, in particular, to simultaneously remove a packing film from a plurality of products in a single operation of the removal system.

Furthermore, the present disclosure is intended to provide a removal system enabling operations of removing a packing film from products and collecting the packing film removed from the products for discarding or recycling to be carried out in a series of operations.

Technical Solution

According to the present disclosure for realizing at least one of the aforementioned objects, there is provided a system for removing a packing film from a product having an axis in a longitudinal direction, the packing film being used to pack the product and surrounding lateral portions of the product, wherein a first end of the packing film surrounding a first longitudinal end of the product is open, and a second end of the packing film surrounding a second end of the product opposite the first end of the product is closed.

The system for removing a packing film according to the present disclosure may include: a conveyor configured to carry a plurality of products each packed with a packing film in a direction perpendicular to the axes of the plurality of products while supporting the plurality of products such that the axes of the plurality of products are parallel to each other; a film removal unit including a suction unit configured to draw the first end of the packing film in an axial direction of each of the products and a clamping unit configured to clamp the first end of the packing film drawn by the suction unit, wherein the film removal unit is moved in the axial direction of the product between a position in which the film removal unit approaches the product and a position in which the film removal unit is separated from the product so as to remove the packing film from the product; and a frame on which the conveyor, a support unit, and the film removal unit are disposed.

In the system for removing a packing film according to the present disclosure, products are disposed in parallel to each other by the conveyor and carried in the direction perpendicular to the axes of the products. The clamp unit and the suction unit are moved in the axial direction of the product by drawing and clamping the first end of the packing film so as to remove the packing film from the product.

Consequently, when the packing film is drawn along the axis from the product, the open first end of the packing film is first drawn. Thus, the packing film is removed by an operation of simply drawing the packing film in one direction.

In particular, since the product is carried in a direction perpendicular to the axis, the carrying of the product packed with the packing film, the removal of the packing film from the product, and the carrying of the product from which the packing film is removed are continuously performed in a state in which the product is rested on one conveyor.

In addition, since products are carried while being parallel to each other, when a plurality of suction units and a plurality of clamping units are disposed in parallel to each other on the film removal unit, it is possible to simultaneously remove packing films from a plurality of products.

As an additional feature of the present disclosure, in the removal system according to the present disclosure, the suction unit may include a suction member to which a negative pressure is applied such that the suction member draws the first end of the packing film by approaching the first end of the product. The clamping unit may include a pair of clamping bars disposed on both sides of the suction member to be in contact with or separated from each other in order to clamp the first end of the packing film drawn by the suction unit.

In the removal system having the additional feature according to the present disclosure, the suction member of the suction unit may move in a direction away from the first end of the product after having drawn the first end of the packing film. The pair of clamping bars of the clamping unit may be disposed on both sides of the suction member and configured to move backward from positions of the clamping bars by moving in a direction in which the suction member is separated from the first end of the product and then come into contact with each other to clamp the first end of the packing film.

According to this configuration, in a state in which the suction member and the clamping bar are disposed in parallel to each other, when the first end of the packing film is drawn from the product by drawing the packing film by the suction member, the clamping bar may clamp the drawn first end of the packing film.

As another additional feature of the present disclosure, the clamping unit may clamp the first end of the packing film drawn by the suction unit. The film removal unit may remove the packing film from the product by moving to the position in which the film removal unit is separated from the first end of the product in a state in which the clamping unit has clamped the first end of the packing film.

As a specific implementation aspect of the additional feature, the clamping unit may remove the first end of the packing film from the suction unit by moving to be separated from the suction unit in a direction opposite to a direction in which the packing film is drawn by the suction unit after the packing film is removed from the product.

As an additional feature of the present disclosure, the conveyor may be configured such that the product is inclined downward from the second end to the first end in the axial direction. The film removal unit may be configured such that the suction unit and the clamping unit move coaxially with the axis of the product.

As a specific implementation aspect of the additional feature, the film removal unit may further include a rail extending such that the product is inclined downward in the axial direction. The suction unit and the clamping unit may be movable together along the rail to draw and clamp the first end of the packing film and then move downhill along the rail, thereby removing the packing film from the product.

In addition, according to an additional feature of the present disclosure, the film removal unit may be movable with respect to the frame between the position in which the film removal unit approaches the conveyor and the position in which the film removal unit is separated from the conveyor.

According to this configuration, the suction unit and the clamping unit of the film removal unit may perform two operations, i.e., an operation of moving coaxially with the axis of the product and an operation of moving on the frame between the position in which the film removal unit approaches the conveyor and the position in which the film removal unit is separated from the conveyor.

In the two operations, the suction unit and the clamping unit may perform an operation of removing the packing film from the product in the operation of moving coaxially with the axis of the product. In operation of moving on the frame, the packing film removed from the product may be carried for discarding or recycling by blowing air to the packing film by the blower unit.

The blower unit may be disposed between a position in which the film removal unit approaches the frame and a position in which the film removal unit is separated from the frame to blow air while the film removal unit is moving to the position in which the film removal unit is separated from the frame.

According to an additional feature of the present disclosure, the removal system according to the present disclosure may further include the support unit disposed adjacent to the first end of the product to support the first end of the product in an operation of removing the packing film from the product. The support unit may include a pair of support bars disposed above the conveyor and configured to come into contact with the first end of the product on both sides of the suction member while moving upward and downward to approach and be separated from the product. The support bars may come into contact with the first end by moving downward at a point in time at which the suction unit starts drawing the first end of the packing film.

Advantageous Effects

The removal system according to the present disclosure may remove a packing film from a product by a simple operation of the film removal unit, i.e., an operation of the film removal unit in one direction, while simply carrying the product on the conveyor in one direction without rotating the product or moving the product in a complex manner.

Thus, the system may have a simple configuration to reduce fabrication costs. Due to simple configuration and operations, the system may have high reliability with a significantly low possibility of malfunctioning. In addition, since the system may simultaneously process a plurality of products, it is possible to significantly reduce work time and improve the efficiency of the operation of the system.

According to the removal system of the present disclosure, the clamping bars may be disposed around the suction members to be able to draw and clamp adjacent portions of the packing film. The drawing operation and the clamping operation may be performed without interference. Thus, the suction unit and the clamp unit may be implemented as a single device instead of being formed separately.

Since the suction members in the removal system according to the present disclosure move backward from the positions of the clamping bars, the suction members may simultaneously avoid interference with the operation of the clamping bars by the operation of drawing the packing film.

When the suction members draw the packing film under vacuum, a portion of the packing film remains on the suction unit after the vacuum suction is finished. Even in the case that the packing film removed from a product should also be removed from the removal system according to the present disclosure, a unit for performing a separate operation is necessary in order to remove the packing film remaining on the suction unit.

However, according to the additional features, the clamping unit for clamping the packing film is configured to perform an additional operation, and thus also has a function of removing the packing film from the suction unit. Thus, a separate device for removing the packing film from the suction unit is not necessary, and thus the configuration of the system is simple and inexpensive.

Since the conveyor is configured to have a slope, when a product is placed on the conveyor, the product may move downward in the transverse direction of the conveyor by the gravity without any operation or configuration. Thus, the operation of bringing the film removal unit to one end of the product may be performed reliably.

In addition, since the suction unit and the clamping unit of the film removal unit are configured to move on the same axis as the axis of a product, the operation of removing the film from the product may be properly or smoothly performed only by the movement of the suction unit and the clamping unit.

The support unit of the removal system according to the present disclosure may enable an operation of peeling the packing film from one end of a product to be performed smoothly at a starting point in time of the operation.

Since the packing film is typically formed of a thin synthetic resin material, during the vacuum drawing by the suction unit, the first end of the packing film may also be drawn to thereby obstruct the operation of the suction unit.

However, since the support bars on both sides of the suction members are in contact with the first end of a product, the first end of the packing film may be drawn using the suction members while the packing film is sliding with respect to the support bars. Thus, the drawing operation of the suction unit may be performed significantly smoothly.

DETAILED DESCRIPTION OF THE INVENTION

Hereinafter, as details for implementing the present disclosure, a configuration and operation of a removal system for automatically removing a packing film from a product according to an embodiment of the present disclosure will be described with reference to the drawings.

The removal system according to the present disclosure is configured to remove a packing film from a product having the configuration illustrated in FIG. 1.

A packing film 5, with which a product 1 is packed, has a longitudinally extending shape to comply with the shape of the product 1. The packing film 5 is configured such that a first end 6 of the packing film surrounding a first longitudinal end 2 of the product 1 is closed and a second end 7 of the packing film surrounding a second end 3 of the product 1 opposite the first end 2 is open. Here, the expression "open" does not mean that the product 1 are exposed through the second end 7, but means that the second end 7 of the packing film 5 is not sealed by fusion or another means. In FIG. 1, the second end 7 is illustrated as being closed, with portions of the film forming the second end 7 overlapping each other.

An operation of removing the packing film 5 from the product 1 includes fixing the product 1 in a predetermined position and peeling the packing film 5 from the product 1 by drawing (or attracting) the first longitudinal end 6 of the packing film 5 under vacuum.

Meanwhile, the product 1 illustrated in FIG. 1 are packed in the packing film 5 such that synthetic resin vessels having the shape of a bowl for containing food are stacked on each other in the top-bottom direction, but the removal system according to the present disclosure is not limited to a product of this type. When an elongated product is packed with a packing film having an elongatable shape and one end is not sealed by fusion or another sealing means in a non-peelable manner, the removal system of the present disclosure may be able to remove the packing film from the product.

The product 1 contained in the packing box are transported and stored in the packing box in a state in which the product 1 are packed in the packing film 5. The product 1 are withdrawn from the packing box and introduced into the system for removing a packing film according to the present embodiment. An operation of opening the packing box and withdrawing the product 1 from the packing box and an operation of aligning the product 1 and disposing the product 1 on a conveyor of the removal system according to the present embodiment may be performed by systems each of which automatically performs a corresponding operation, but may be performed manually by a worker.

Hereinafter, the overall configuration of the removal system according to the present disclosure will be described with reference to FIGS. 2 to 4.

Figure 2:
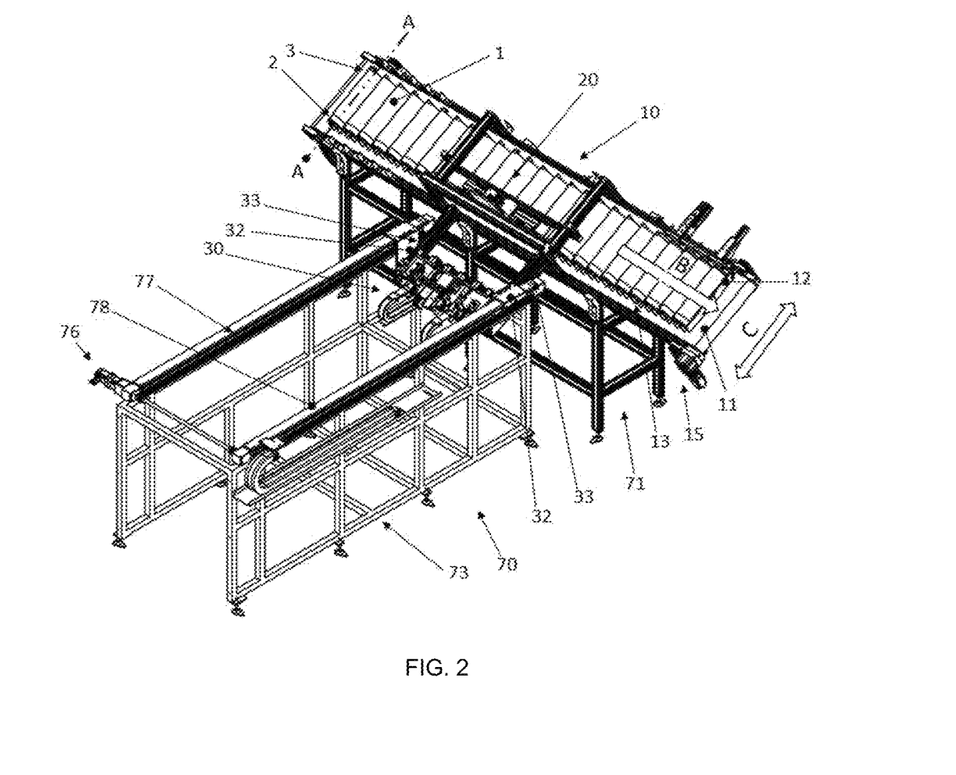
FIGS. 2 and 3 are perspective views illustrating an overall configuration of the system for removing a packing film according to an embodiment of the present disclosure.
Figure 3:
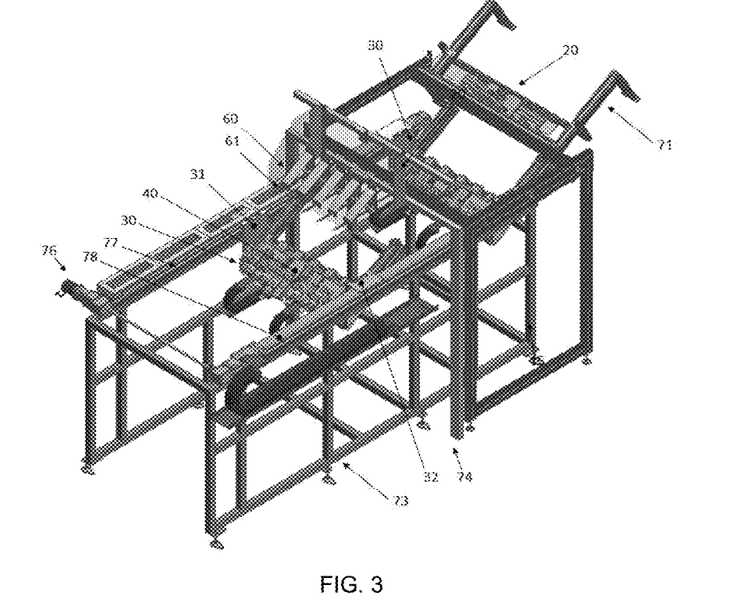

Since the packing film 5 is formed of a transparent material and in close contact with the product 1, the packing film is not illustrated for the sake of brevity in the figures, such as FIGS. 2 and 3, illustrating the removal system according to the present embodiment. In FIG. 1 illustrating the packing film 5, a reference numeral is used to refer to the product in the description.

The removal system according to the present embodiment generally includes: the conveyor 10 configured to support a plurality of products 1 such that the axes of the products 1 are parallel to each other and carry each of the products 1 packed with a packing film 5 in a direction perpendicular to the axis of the product 1; a support unit 20 disposed adjacent to the first end 2 of the product 1 to support the first end 2 of the product 1 in an operation of removing the packing film 5 from the product 1; a film removal unit 30 operating to remove the packing film 5 from the product 1; a blower unit 60 disposed to be spaced apart from the conveyor 10 to blow air to the packing film 5 removed from the product 1 so that the packing film 5 is removed from the film removal unit;

and a frame 70 supporting the conveyor 10, the support unit 20, the film removal unit 30, and the blower unit 60 disposed on the frame 70.

For reference, for the sake of brevity, portions of the blower unit 60 and the frame 70 are not illustrated in FIG. 2. In FIG. 3, the conveyor 10 and a portion of the frame 70 supporting the conveyor 10 are not illustrated, and the film removal unit 30 is illustrated as being disposed in two positions to express the operation of the film removal unit 30. However, the removal system according to the present embodiment includes a single film removal unit 30.

In addition to these components, control units controlling a variety of operations of the components, a variety of sensors or actuators, and the like constitute the removal system according to the present embodiment. However, illustrations and descriptions of such control units, sensors, or actuators will be omitted, since technologies for such control units, sensors, or actuators will be apparent to those skilled in the art from the disclosure of the specification.

Figure 4:
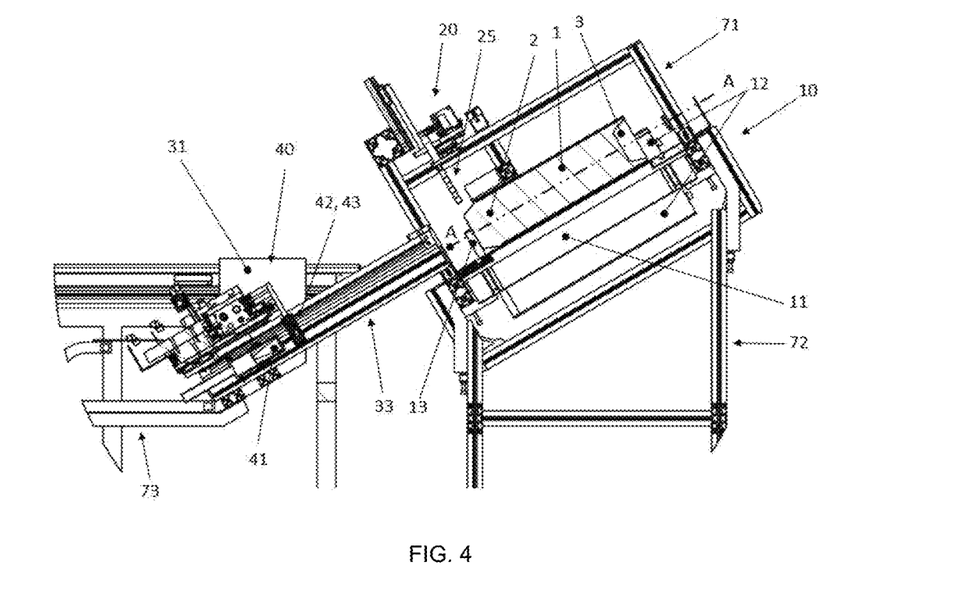
FIGS. 4 and 9 are longitudinal cross-sectional views illustrating portions of the conveyor, the support unit, and the film removal unit of the system for removing a packing film according to an embodiment of the present disclosure.

Referring to FIGS. 2 and 4, the conveyor 10 is configured to carry products 1 in a direction perpendicular to the axes A of the products 1 while supporting the products 1 each packed with the packing film 5, in which the products 1 are disposed in parallel to each other such that the axes A of the products 1 are parallel to each other. In addition, the conveyor 10 is configured such that the width direction C of the conveyor 10 perpendicular to a carrying direction B in which each of the products 1 is carried has a downward slope toward the support unit 20. Thus, the product 1 is supported on the conveyor in a state in which the axis A of the product 1 is inclined downward from the second end 3 toward the first end 2 of the product 1.

The product 1 packed with the packing film 5 is disposed on the conveyor 10 in an upstream position in the carrying direction B, and are carried downstream as the conveyor 10 operates. While the operation of removing the packing film 5 by the film removal unit 30 is being performed, the conveyor 10 stops carrying the product. When the film removal operation is finished, the operation of the conveyor 10 is resumed, and the product 1, from which the packing film 5 is removed, are carried downstream on the conveyor 10.

The conveyor 10 includes a conveyor belt driven in a closed loop by a driving motor 15. Partition walls 12 extending in the transverse direction C are provided on outer sides of the conveyor belt 11 so as to be spaced apart from each other at a distance corresponding to the diameter of the product 1. Thus, such products 1 are placed in parallel to each other on the conveyor belt 11.

In addition, a pair of support pins 13 are provided on portions of the conveyor belt 11 between the partition walls 12 and below positions in which the product 1 are rested, i.e., lower portions of the conveyor belt 11 in the transverse direction. The pair of support pins 13 are disposed on both sides of and spaced apart from the center of the first end 2 of the product 1 to support the product 1.

The support unit 20 is disposed above the conveyor 10, in a substantially middle position in the carrying direction B.

Figure 5:
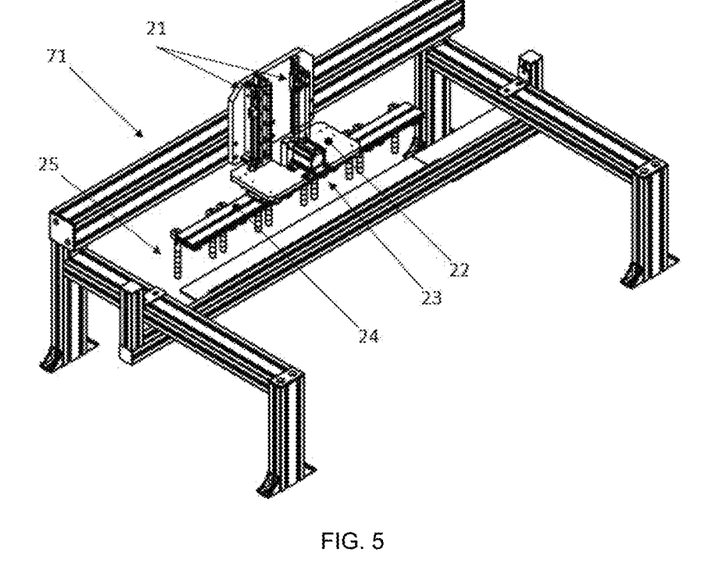
FIG. 5 is a perspective view illustrating a configuration of the support unit of the system for removing a packing film according to an embodiment of the present disclosure.

FIG. 5 separately illustrates portions of the support unit 20 and the frame 70 supporting the support unit 20. With reference to FIG. 5 together with FIG. 4, the configuration of the support unit 20 will be described.

The frame 70 is provided with a first portion 71 extending to above the conveyor 10. First rails 21 extending perpendicularly to the surface of the conveyor belt 11 of the conveyor 10 are provided on the first portion 71 of the frame 70. The movable panel 22 to which the driving motor 23 is attached is movably coupled to the first rails 21. As the driving motor 23 is driven, the movable panel 22 moves on the rails 21 perpendicularly to the surface of the conveyor belt 11.

The movable panel 22 is provided with an attachment panel 24 extending in the carrying direction B, and a plurality of support bars 25 attached to the bottom surface of the attachment panel 24 extend perpendicularly from the attachment panel 24. A pair of support bars, comprised of two of the support bars 25, support the first end 2 of a single product 1.

When the conveyor 10 is operated and the product 1 are carried, the movable panel 22 is moved upward along with the rails 21, so that the support bars 25 do not interfere with the product 1 being carried. When the conveyor 10 is stopped and the packing film 5 is removed from the product 1, the movable panel 22 is moved downward, so that each pair of support bars 25 support a single product 1.

Next, returning to FIGS. 2 and 3, the overall configurations and operations of the frame 70 and the film removal unit 30 will be described.

The frame 70 includes the first part 71 provided above the conveyor 10, with the support unit 20 being disposed on the first part 71, a second part 72 provided in a direction in which the conveyor 10 extends and supporting the conveyor 10, and a third part 73 and a fourth part 74 extending perpendicularly from the second part 72 to support the film removal unit 30.

The film removal unit 30 includes a suction unit drawing the first end of the packing film 5 under vacuum and a clamping unit separating the first end of the packing film 5, drawn by the suction unit, from the suction unit. However, the suction unit and the clamping unit are provided as a single assembly, instead of being provided and disposed separately.

The film removal unit 30 is provided with a body 40 on which not only components of the suction unit and the clamping unit but also a variety of actuators, sensors, control modules, tubes, and the like for operating the components of the suction unit and the clamping unit are disposed.

The body 40 performs two different operations with respect to the conveyor 10. Components for the two motions are provided in the body 40 so as to be distinguished from each other.

In the first operation, the body 40 moves in a direction in which the conveyor 10 has a downward slope. Due to this operation, the suction unit of the body 40 moves along the downward slope while drawing the first end of the packing film 5, thereby peeling the packing film 5 in the longitudinal axis of the product 1.

In the second operation, the suction unit of the body 40 is horizontally moved away from the conveyor 10 after the suction unit has peeled the packing film 5 from the product 1. Due to this operation, the packing film 5 is removed from the suction unit, and the packing film 5 is carried using the blower unit 60.

First, a configuration for the second operation will be described.

FIG. 3 illustrates the body 40 of the film removal unit disposed in two positions, i.e., a position in which the body 40 of the film removal unit approaches the conveyor 10 and the support unit 20 and a position in which the body 40 of the film removal unit is separated from the conveyor 10 and the support unit 20.

Above the third part 73 of the frame, a screw 77 configured to be driven and rotated by a driving motor 76 is provided on one side in the transverse direction perpendicular to a movement direction to extend in the movement direction. A channel 78 guiding a linear movement of the film removal unit 30 is provided on the other side to extend in the movement direction.

Brackets 31 and 32 are provided on both sides in the transverse direction of the film removal unit 30, and are coupled to each other through a connecting panel (33 in FIG. 6) extending between the brackets 31 and 32. One end of one bracket 31 is engaged with and coupled to the screw 77 to apply driving force for the linear movement of the film removal unit 30 in response to the rotation of the screw 77. One end of the other bracket 32 is slidably engaged with the channel 78 to guide the linear movement of the film removal unit 30.

Due to this configuration, each of the film removal unit 30 linearly moves on a horizontal surface in response to the driving of the screw 77, between positions approaching and being separated from the conveyor 10.

Figure 6:
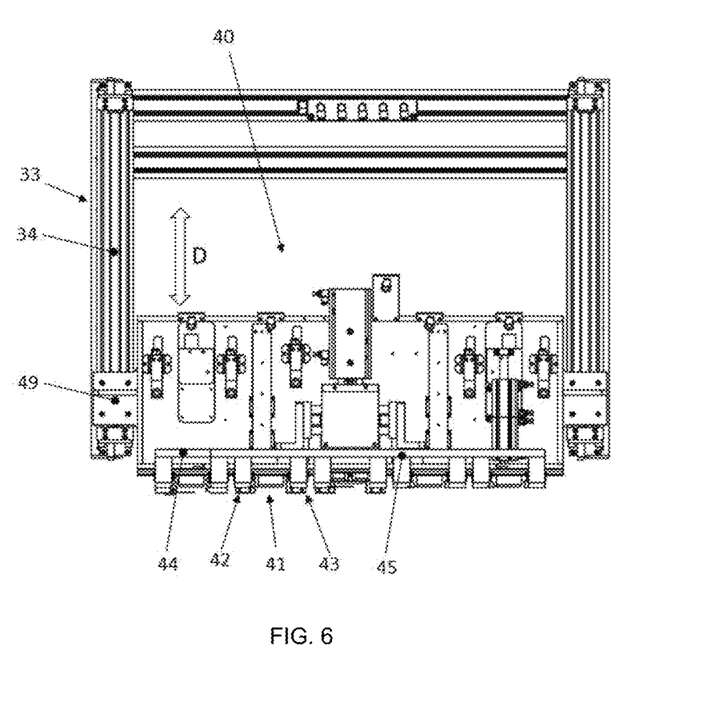
FIGS. 6 to 8 are plan, front, and longitudinal cross-sectional views illustrating a configuration of the film removal unit of the system for removing a packing film according to an embodiment of the present disclosure.
Figure 7:
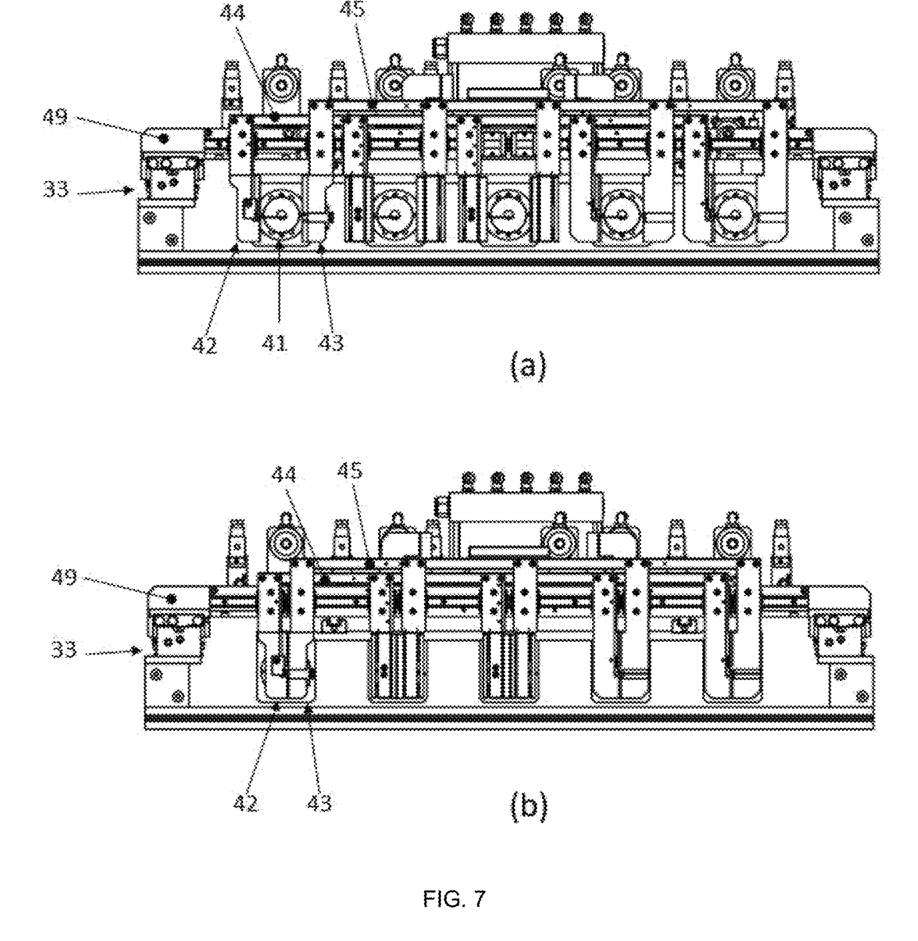

Next, a configuration for the first operation will be described with reference to FIGS. 2 and 3 together with FIGS. 6 and 7 illustrating the body 40 of the film removal unit 30.

Third rails 33 are provided on both sides in the transverse direction of the brackets 31 and 32 and the connecting panel (33 in FIG. 6). A screw 34 is disposed inside each of the third rails 33, and coupling portions 49 provided on both ends of the body 40 are engaged with the screws 34. In response to the rotation of the screws 34, the body 40 of the film removal unit 30 linearly moves in the direction in which the third rails 33 extend.

The third rails 33 are disposed in parallel to the transverse direction C of the conveyor 10 at the same slope as the slope direction of the conveyor 10. The body 40 moves uphill along the third rails 33 to draw the packing film 5 from the product 1 rested on the conveyor 10 adjacently to the conveyor 10 and the support unit 20. Afterwards, the body 40 that has drawn the packing film 5 moves downhill along the third rails 33, thereby peeling and separating the packing film 5 from the product 1.

A configuration and operation of the body 40 and configurations and operations of the suction unit and the clamping unit provided in the body 40 will be described with reference to FIGS. 6 to 8.

Five (5) suction members 41 are provided on lower portions of the body 40, directed toward the movement direction. The suction members 41 are connected to a blower unit (not shown) disposed inside the body 40 such that a negative pressure is applied to the suction members 41. The suction members 41 are in contact with the first end 2 of the product 1 to draw the end of the packing film 5.

Figure 8:
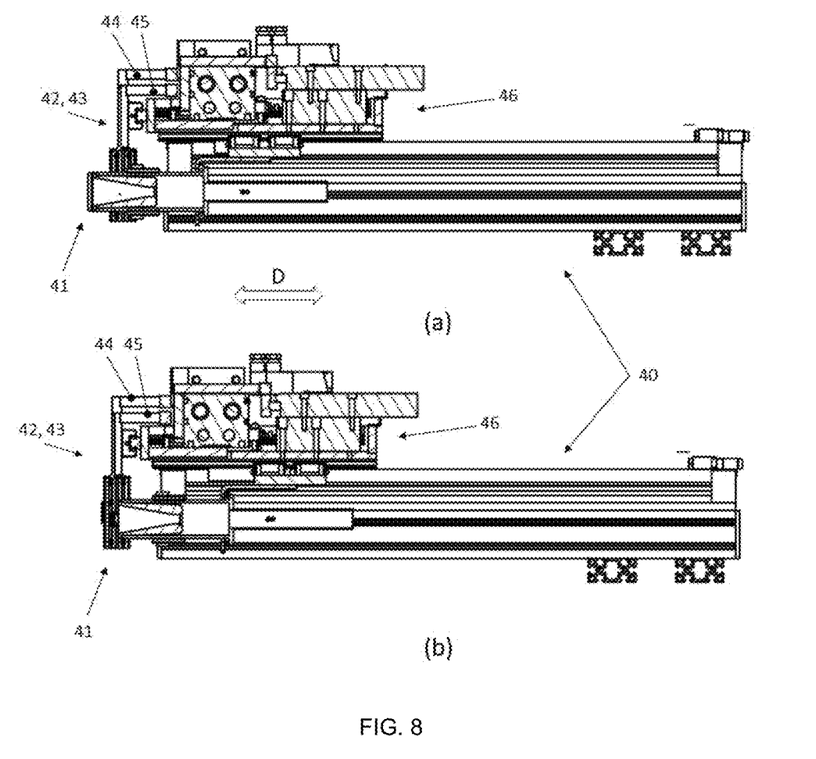

In addition, as compared through FIGS. 8 (a) and (b), each of the suction members 41 is configured to be movable forward and backward in the movement direction D. In the forwardly moved position, the suction member 41 is in contact with the first end 2 of the product 1 to start a drawing operation. Then, the suction member 41 moves backward to draw the packing film 5 from the product 1.

A pair of clamping bars 42 and 43 of the clamping unit are disposed on both sides in the transverse direction of the leading end, i.e., a portion to be in contact with the product 1, of each of the suction members 41.

Referring to FIG. 7, five (5) clamping bars 42 are provided to the left of the suction members 41, and clamping bars 43 are provided to the right of the suction members 42. In an upper position, each of the clamping bars and the clamping bars 43 is connected to a single movable bar 44 or 45.

Since the movable bars 44 and 45 are moved in opposite directions in the transverse direction, a pair of clamping bars 42 and 43 is converted between a position in which the clamping bars 42 and 43 are separated from each other on both sides of the suction member 44 as illustrated in FIG. 6 (a) and a position in which the clamping bars 42 and 43 are in contact with each other as illustrated in FIG. 7 (b).

The clamping bars 42 and 43 are in contact with each other so as to clamp the packing film 5 drawn by the suction members 41. In an operation of the suction members 41 drawing the packing film 5, the clamping bars 42 and 43 are separated from each other so as not to interfere with the drawing operation of the suction members 41. In addition, the separation operation unclamps the packing film 5 from the clamping bars.

In addition, referring to FIG. 8, the clamping bars 42 and 43, the movable bars 44 and 45 to which the clamping bars 42 and 43 are coupled, and components for operating the clamping bars 42 and 43 and the movable bars 44 and 45 are provided on a sub-assembly 46, which is configured to be movable forward and backward in the movement direction D.

When the suction members 41 start the drawing operation and move backward to the position illustrated in FIG. 7 (b), the movable bars 44 and 45 are operated and the clamping bars 42 and 43 are moved to the position illustrated in FIG. 6 (b) so as to clamp the end of the packing film 5 drawn by the suction members 41.

In this manner, in a state in which the suction members 41 and the clamping bars 42 and 43 have drawn and clamped the packing film 5, the body 40 film removal unit moves downhill along the third rails 33 so as to peel the packing film 5 along the axis of the product 1.

During the downhill movement of the body 40 like this, the drawing operation of the suction members 41 is finished, and the packing film 5 is clamped by only the clamping bars and 43. Here, the first end of the packing film 5 remains drawn into the suction members 41.

The movable bars 44 and 45 perform a forward movement in the movement direction, and responsively, the clamping bars 42 and 43 clamp the packing film 5. In this state, a forward movement is performed to separate the packing film from the suction members 41.

Returning to FIG. 3, the blower unit 60 is provided with five (5) blower nozzles 61.

The fourth part 74 of the frame supporting the blower unit 60 is disposed above the third part 73, in a position substantially in the middle of the third part 73 of the frame guiding and supporting the movement of the film removal unit 30. The five blower nozzles 61 are disposed in parallel to each other in the transverse direction of the body 40 of the film removal unit 30.

The blower nozzles 61 are supplied with compressed air from a compressed air source (not shown), and are disposed to blow out the compressed air in the direction of a rear side toward leading ends of the clamping bars 42 and 43 and the suction members 41 from the body 40, i.e., a direction in which the body 40 of the film removal unit 30 is separated from the conveyor 10.

Due to this configuration, after the operation of removing the packing film 5 by the clamping bars 42 and 43 and the suction members 41 is completed, with the body 40 of the film removal unit 30 moving to the position in which the film removal unit 30 is separated from the product, and the drawing and clamping operations are finished, the packing film 5 is separated from the body 40 of the film removal unit 30 by the compressed air blown from the blower nozzles 61 and is moved in the blowing direction of the compressed air to be collected.

As described above, the configuration of the system for removing a packing film according to an embodiment of the present disclosure and the operations of the components of the system have been described. Subsequently, overall operations of introducing the product 1 packed with the packing film 5 into the system for removing a packing film according to the present embodiment and removing the packing film 5 using the system will be described.

Referring to FIG. 2, products 1, disposed in parallel to each other and respectively packed with a packing film 5, are carried on the conveyor 10.

The removal system according to the present embodiment may simultaneously process maximum five (5) products with a single operation. When five products 1, from each of which the packing film 5 has not been removed, reach the position of the support unit 20, the conveyor 10 is stopped.

Figure 9:
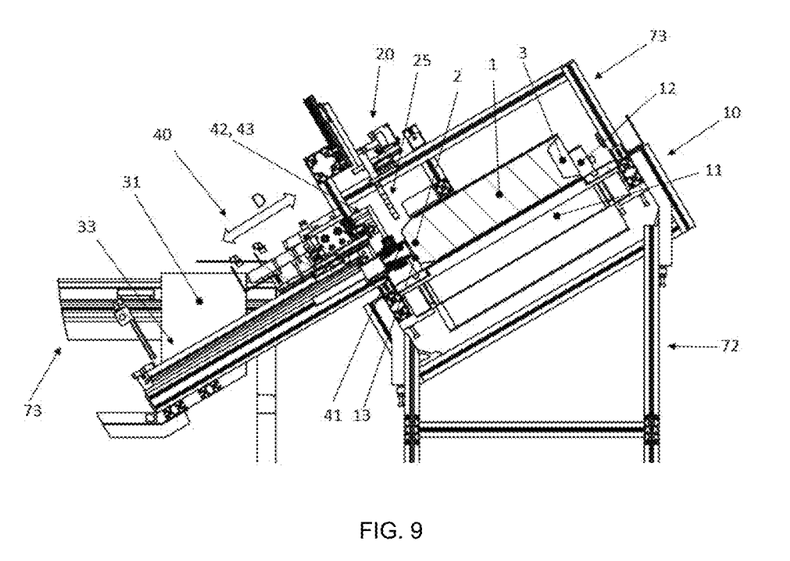

FIG. 9 illustrates a state in which the conveyor 10 is stopped and a state at a point in time at which the removal of the packing film 5 by the film removal unit 30 is started.

At the point in time at which the removal of the packing film 5 is started, the film removal unit 30 moves to the position in which the suction members 41 and the clamp bars 42 and 43 approach the first end 2 of each of the products 1.

First, as the position of the film removal unit 30 is illustrated in FIG. 3, in response to the screw 77 being driven, the third rails 33 and the first and second brackets 31 and 32 move to the position approaching the conveyor 10 along the channel 78. Afterwards, the body 30 of the film removal unit 30 moves upward from the position in which the body is disposed below the third rails 33, as illustrated in FIG. 4, along the third rails 33, as illustrated in FIG. 9. Consequently, the suction members 41 and the clamping bars 42 and 43 come into close contact with the first end 2 of each of the products 1.

In this close position, the suction members 41 is disposed in the forwardly moved position, and the clamping bars 42 and 43 are expanded around the suction members 41.

Before the suction members 41 start the drawing, the support bars 25 of the support unit 20 move downward. When the support bars 25 are in the downwardly moved position, a pair of support bars 25 are in contact with the first end 2 of each of the products 1.

Since the conveyor 10 has a downward slope, the products 1 are supported by the support pins 13 of the conveyor 10 so as not to drop from the conveyor belt 11. A support bars 25 of the support unit 20 are disposed adjacent to the suction members 41 of the film removal unit 30. In the drawing operation of the suction members 41, the support bars 25 support the product 1 and allow the packing film 5 to smoothly slide along the surface of the product 1 and be peeled from the product 1.

In the state in which the support unit 20 that has moved downward supports each of the products 1, the film removal unit 30 is operated.

First, the suction members 41 start the drawing, so that the portion of the packing film 5 covering the first end 2 of the product 1 is drawn by the suction members 41, and the suction members 41 move backward from the body 40, thereby drawing the packing film 5 from the product 1.

Afterwards, the clamping bars 42 and 43 approach each other to clamp the packing film 5 therebetween, and the drawing by the suction members 41 is stopped.

The packing film (5 in FIG. 1) is clamped by the clamping bars 42 and 43, and the body 40 moves along the third rails 33. Since the third rails 33 is inclined like the conveyor 10, the movement direction of the body 40 is coaxial with the axis A of the product 1 rested on the conveyor 10.

Consequently, the packing film 5 is peeled from the product 1 while being pulled along the axis A of the product 1. At a point in time at which the body 40 has moved to the lower ends of the third rails 33, the packing film 5 is completely separated from the product 1.

Thereafter, the screw 77 is operated, and the film removal unit 30 moves from the close position to the separated position in FIG. 3.

During the movement, the clamping bars 42 and 43 move in a direction away from the suction members 41. Consequently, one end of the packing film 5 that has been inserted into the suction member 41 by the drawing operation of the suction member 41 is separated.

The blower unit 60 is operated to blow compressed air in a direction opposite to the conveyor 10. As the film removal unit 30 passes by the position of the blower unit 60, the clamping bars 42 and 43 are separated from each other, thereby stopping clamping the packing film 5.

Consequently, the packing film 5 is separated from the film removal unit 30 and is carried in the direction opposite to the conveyor 10 by the air blown from the blower unit 60.

In this manner, the operations of simultaneously removing the packing films 5 from the five products 1 and carrying the removed packing films 5 are completed.

When the packing films 5 are simultaneously removed from the five products 1, the conveyor 10 moves the conveyor belt 11 by the distances of the five products, and the products 1, from which the packing films 5 are removed, move downstream of the conveyor 10 and are transported from the conveyor 10 to another place by a separate apparatus.

The film removal unit 30 moves again to the initial position in which the film removal unit 30 approaches the conveyor 10 and restarts the film removal operation. In response to the operation of the conveyor 10, products 1 packed with packing films 5 are carried again to positions facing the film removal unit 30.

As set forth above, in the system for removing a packing film according to embodiments of the present disclosure, the operations of introducing and removing products, transporting the products from which packing films are removed, and transporting the packing films removed from the products are automatically performed without the intervention of a worker.

In particular, in the system according to the present embodiment, five products are simultaneously processed, and thus the operation of removing packing films from the products may be rapidly performed. Although a variety of unit sets each comprised of five units are provided according to the present embodiment in order to simultaneously process five products, the system may be configured to process only a single product. The configuration according to the present embodiment may be adapted as required in order to simultaneously process a selected number of products.

Hereinbefore, the configuration and the operation of the system for removing a packing film according to embodiments of the present disclosure have been described, but various modifications and addition of elements are possible without departing from the claim without being limited to these embodiments.

The invention claimed is:
1. A system for removing a packing film from a product having an axis in a longitudinal direction, the packing film being used to pack the product and surrounding lateral portions of the product, wherein a first end of the packing film surrounding a first longitudinal end of the product is open and a second end of the packing film surrounding a second end of the product opposite the first end of the product is closed, the system comprising:
- a conveyor configured to carry a plurality of products each packed with a packing film in a direction perpendicular to axes of the plurality of products while supporting the plurality of products such that the axes of the plurality of products are parallel to each other;
- a film removal unit comprising a suction unit configured to draw the first end of the packing film in an axial direction of each of the products and a clamping unit configured to clamp the first end of the packing film drawn by the suction unit, wherein the film removal unit is moved in the axial direction of the product between a position in which the film removal unit approaches the product and a position in which the film removal unit is separated from the product so as to remove the packing film from the product; and
- a frame on which the conveyor, a support unit, and the film removal unit are disposed, wherein the suction unit comprises a suction member to which a negative pressure is applied such that the suction member draws the first end of the packing film by approaching the first end of the product, and the clamping unit comprises a pair of clamping bars disposed on both sides of the suction member to be in contact with or separated from each other in order to clamp the first end of the packing film drawn by the suction unit, wherein the suction member of the suction unit is configured to move in a direction away from the first end of the product after having drawn the first end of the packing film, and the pair of clamping bars of the clamping unit are disposed on both sides of the suction member and configured to move backward from positions of the clamping bars by moving in a direction in which the suction member is separated from the first end of the product and then come into contact with each other to clamp the first end of the packing film.

2. The system according to claim 1, wherein the clamping unit clamps the first end of the packing film drawn by the suction unit, and the film removal unit removes the packing film from the product by moving to the position in which the film removal unit is separated from the first end of the product in a state in which the clamping unit has clamped the first end of the packing film.

3. The system according to claim 2, wherein the clamping unit removes the first end of the packing film from the suction unit by moving to be separated from the suction unit in a direction opposite to a direction in which the packing film is drawn by the suction unit after the packing film is removed from the product.

4. The system according to claim 1, wherein the conveyor is configured such that the product is inclined downward from the second end to the first end in the axial direction, and
the film removal unit is configured such that the suction unit and the clamping unit move coaxially with the axis of the product.

5. The system according to claim 4, wherein the film removal unit further comprises a rail extending such that the product is inclined downward in the axial direction, and
the suction unit and the clamping unit are configured to be movable together along the rail to draw and clamp the first end of the packing film and then move downhill along the rail, thereby removing the packing film from the product.

6. The system according to claim 5, wherein the film removal unit is configured to be movable with respect to the frame between the position in which the film removal unit approaches the conveyor and the position in which the film removal unit is separated from the conveyor.

7. The system according to claim 6, further comprising a blower unit carrying the packing film removed from the product by blowing the packing film,
wherein the blower unit is disposed between a position in which the film removal unit approaches the frame and a position in which the film removal unit is separated from the frame to blow air while the film removal unit is moving to the position in which the film removal unit is separated from the frame.

8. The system according to claim 1, further comprising the support unit disposed adjacent to the first end of the product to support the first end of the product in an operation of removing the packing film from the product,
wherein the support unit comprises a pair of support bars disposed above the conveyor and configured to come into contact with the first end of the product on both sides of the suction member while moving upward and downward to approach and be separated from the product,
wherein the support bars come into contact with the first end by moving downward at a point in time at which the suction unit starts drawing the first end of the packing film.

* * * * *